United States Patent [19]

Peynaud

[11] Patent Number: 5,142,505
[45] Date of Patent: Aug. 25, 1992

[54] SONAR FOR AVOIDING SUB-SURFACE UNDERWATER OBJECTS

[75] Inventor: Francois Peynaud, Brest, France

[73] Assignee: Thomson-CSF, Puteaux, France

[21] Appl. No.: 521,547

[22] Filed: May 10, 1990

[30] Foreign Application Priority Data

May 10, 1989 [FR] France .................. 89 06105

[51] Int. Cl.$^5$ ............................. G01S 15/87
[52] U.S. Cl. ..................... 367/103; 367/93; 367/909
[58] Field of Search ............ 367/88, 92, 93, 103, 367/104, 106, 153, 12, 909

[56] References Cited

U.S. PATENT DOCUMENTS

| | | | |
|---|---|---|---|
| 2,787,776 | 4/1957 | Rudy | 367/125 |
| 3,178,678 | 4/1965 | Grieg | 367/909 X |
| 3,579,180 | 5/1971 | Taddeo | 367/122 |
| 3,652,978 | 3/1972 | Halliday et al. | 367/12 |
| 3,740,705 | 6/1973 | Lowvance | 367/909 X |
| 3,800,274 | 3/1974 | Peynaud | 367/90 |
| 3,818,425 | 6/1974 | Peynaud et al. | 367/12 |
| 3,886,487 | 5/1975 | Walsh et al. | 367/909 X |
| 4,104,912 | 8/1978 | Clavelloux et al. | 73/170 A X |
| 4,270,191 | 5/1981 | Peynaud | 367/91 |
| 4,308,749 | 1/1982 | Clavelloux et al. | 73/170 A |
| 4,311,045 | 1/1982 | Clavelloux et al. | 73/170 A |
| 4,516,226 | 5/1985 | Peynaud et al. | 367/6 |
| 4,596,007 | 6/1986 | Grall et al. | 367/92 |

FOREIGN PATENT DOCUMENTS

WO8505694 12/1985 PCT Int'l Appl.

Primary Examiner—Brian S. Steinberger
Attorney, Agent, or Firm—Oblon, Spivak, McClelland, Maier & Neustadt

[57] ABSTRACT

Disclosed is a sonar for avoiding sub-surface underwater objects, for a surface vessel, having its directivity in elevation optimized to observe the surface and its surface reverberation reduced to the minimum. It consists in using an acoustic antenna having two columns of n transducers, the first column insonifying, at transmission, an elevation sector corresponding to the collision-risk zone and forming channels at reception, in the insonified elevation sector, the width of the channels being all the finer as the desired precision of the measurement of the position in elevation is high. The second column is necessary for the localization in relative bearing. The disclosure can be applied to the precise localization in elevation of objects located in the path of a vessel.

10 Claims, 5 Drawing Sheets

FIG_1
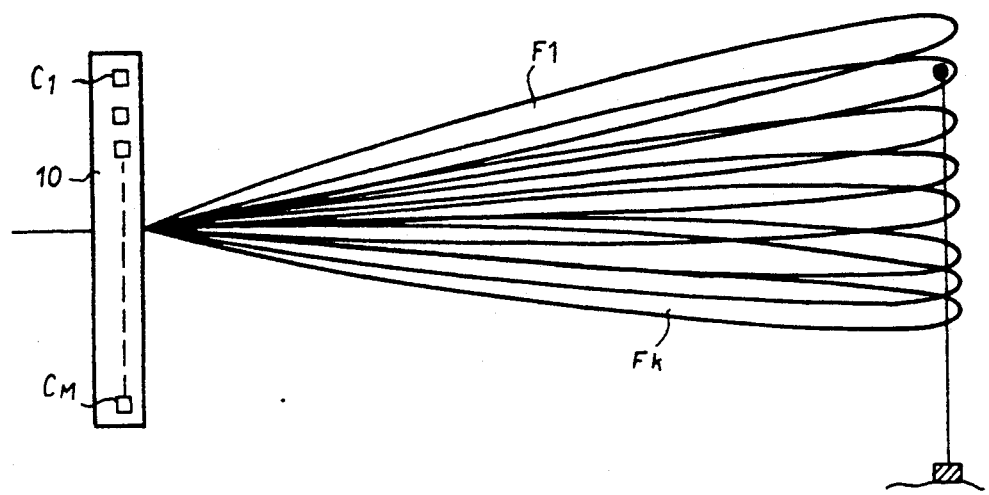
FIG_2
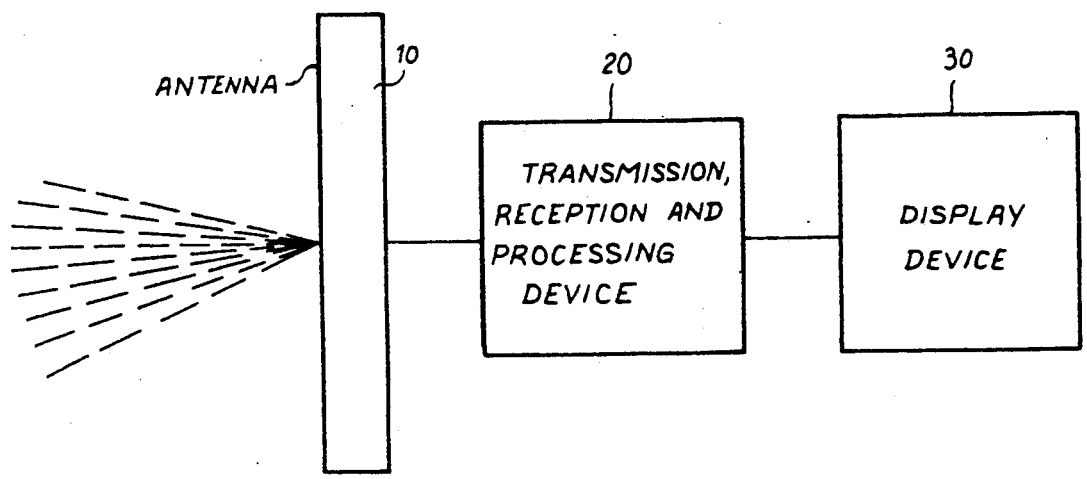

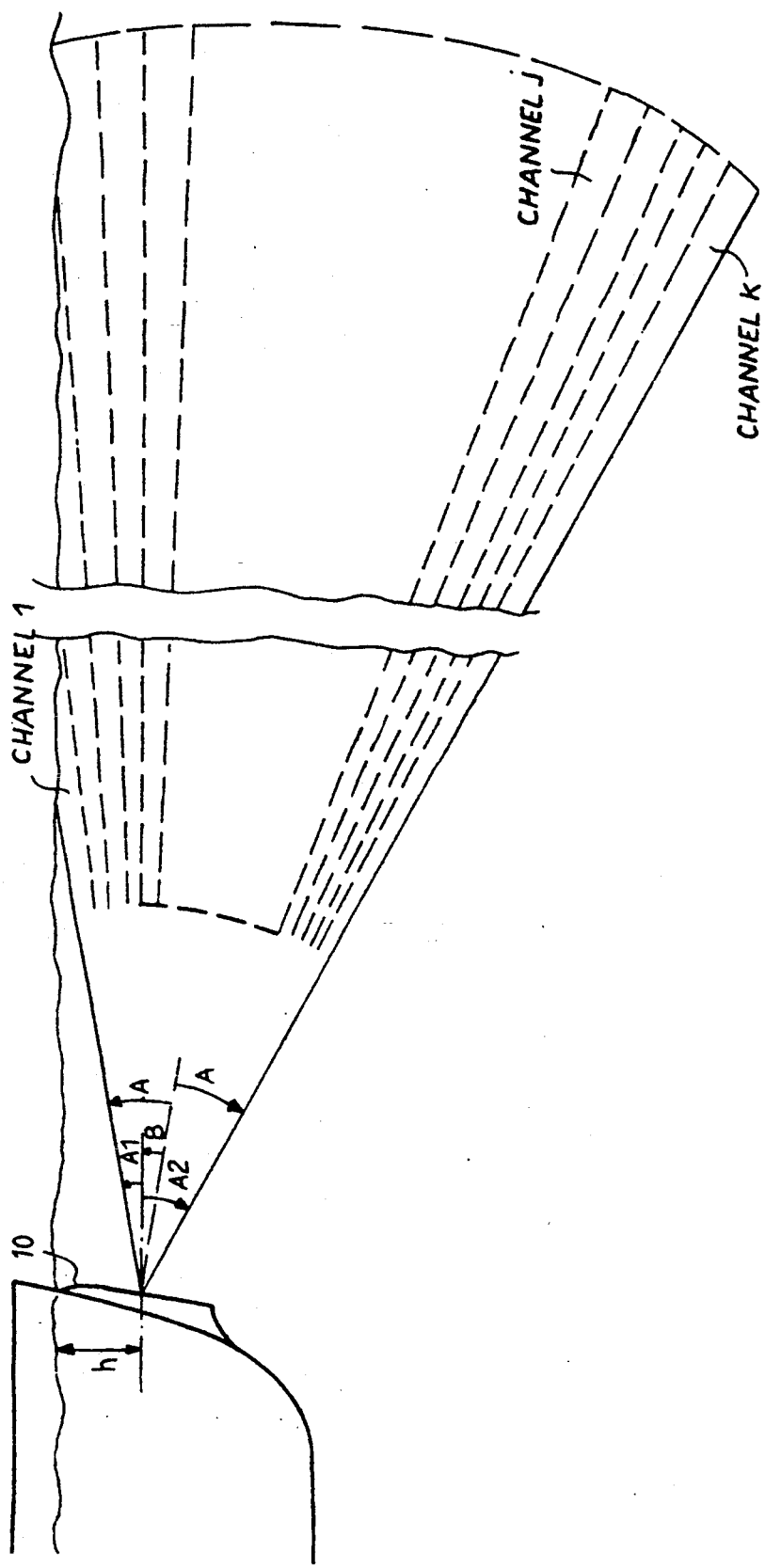

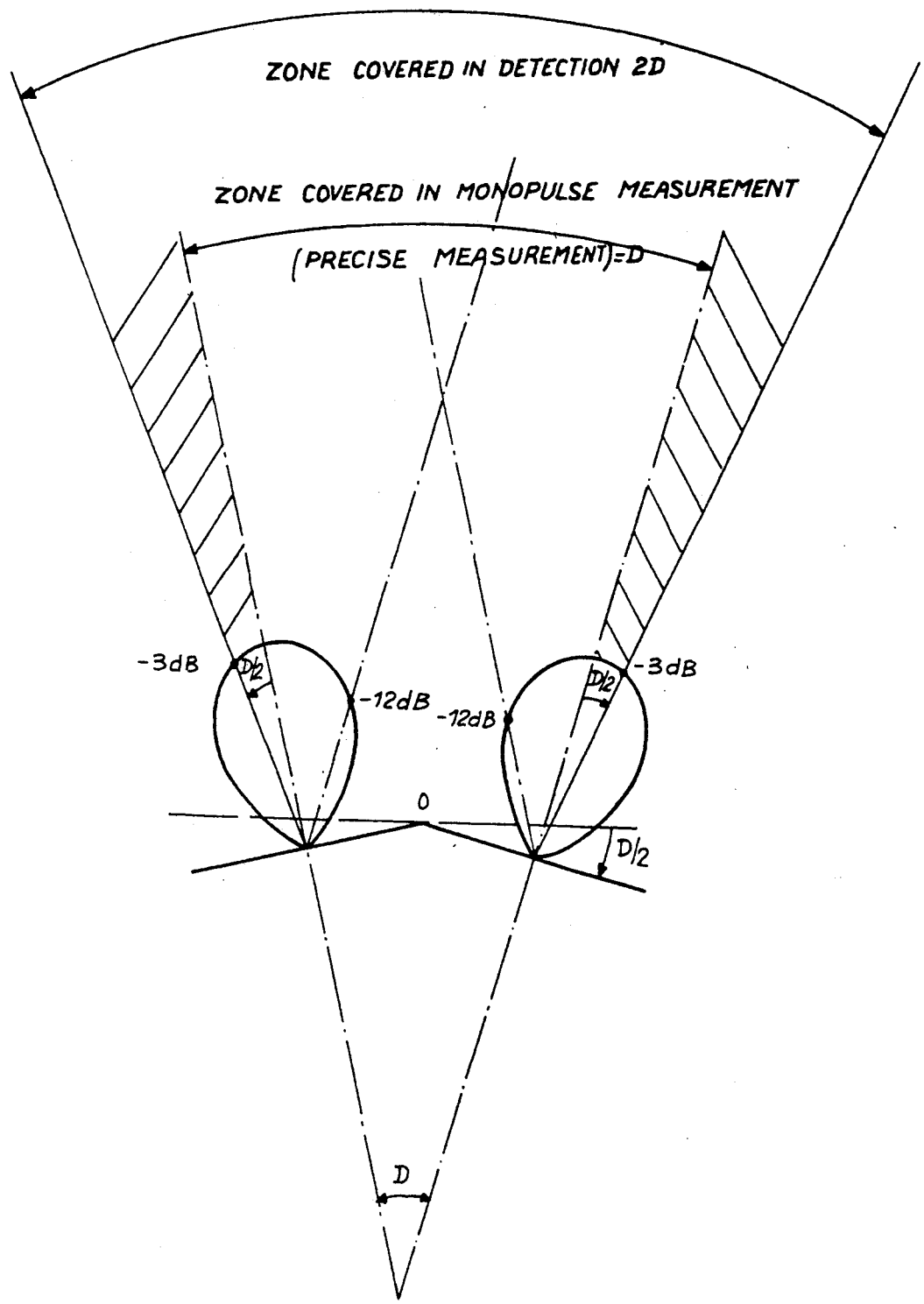
FIG_4

FIG_5
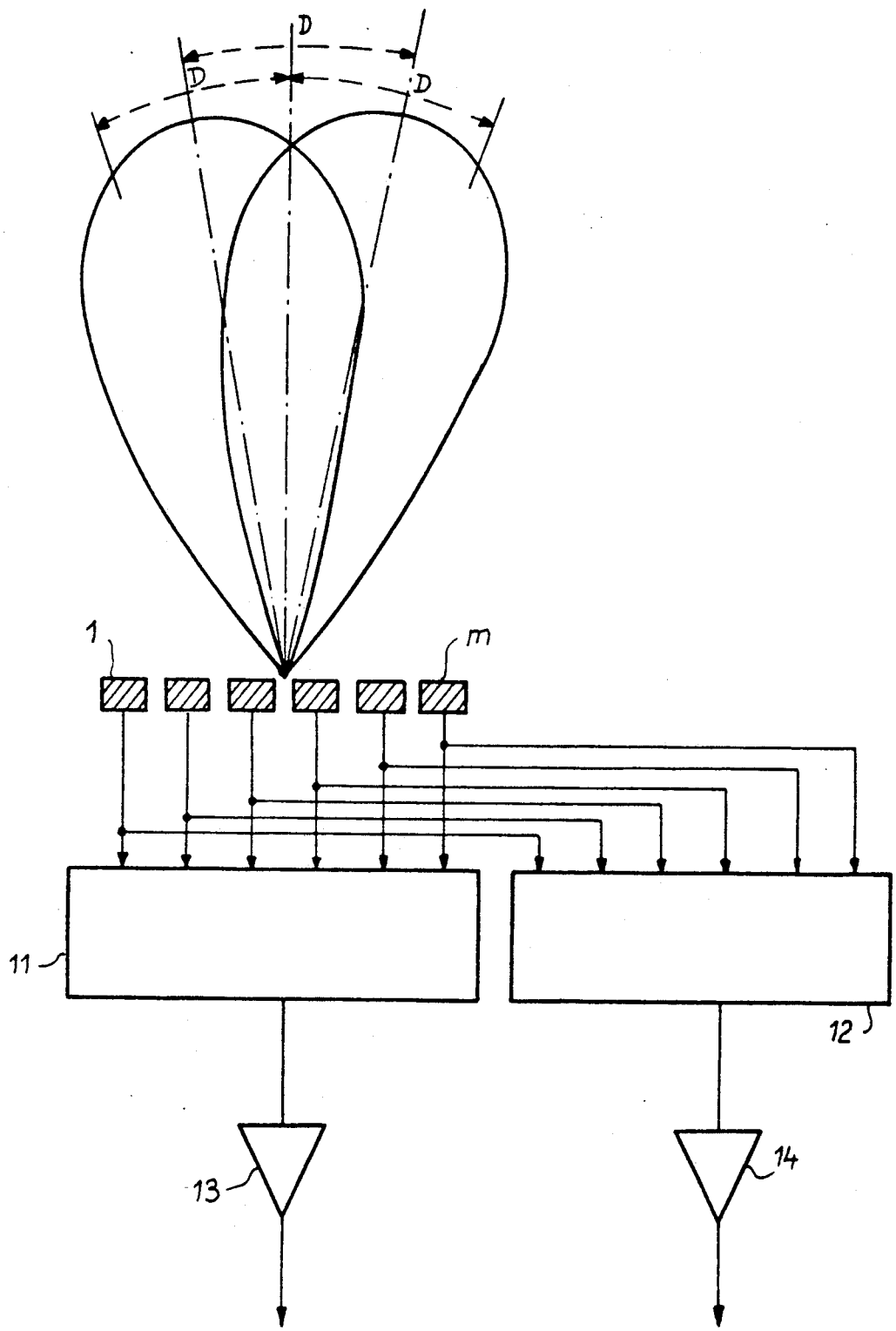

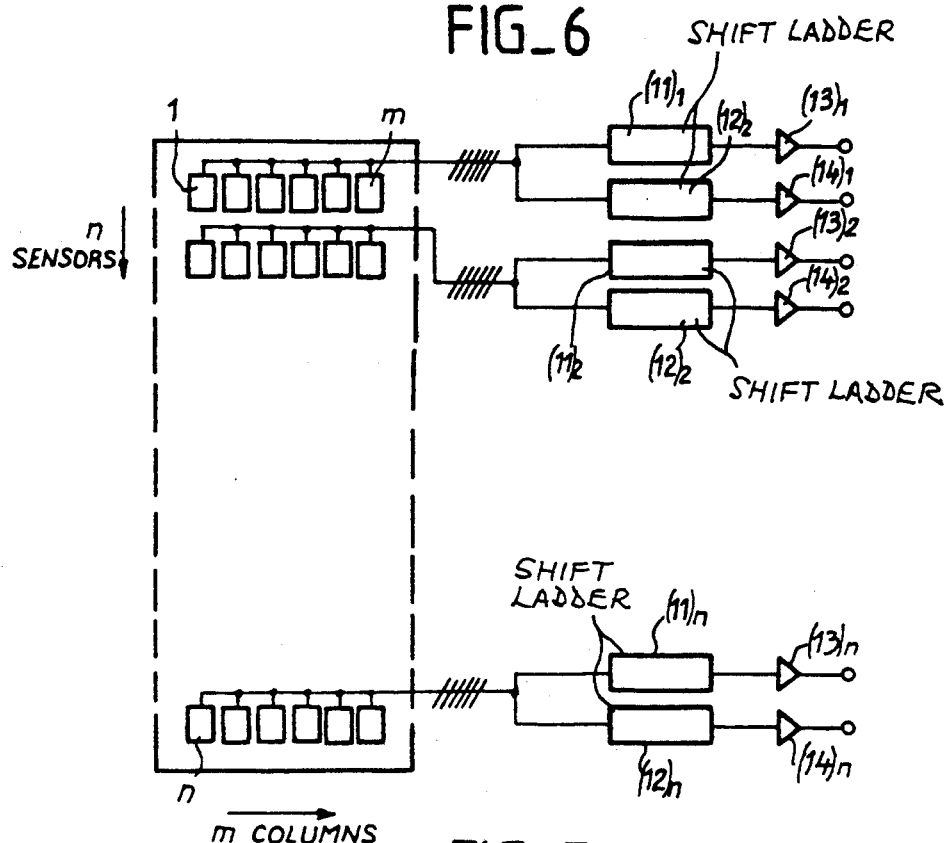
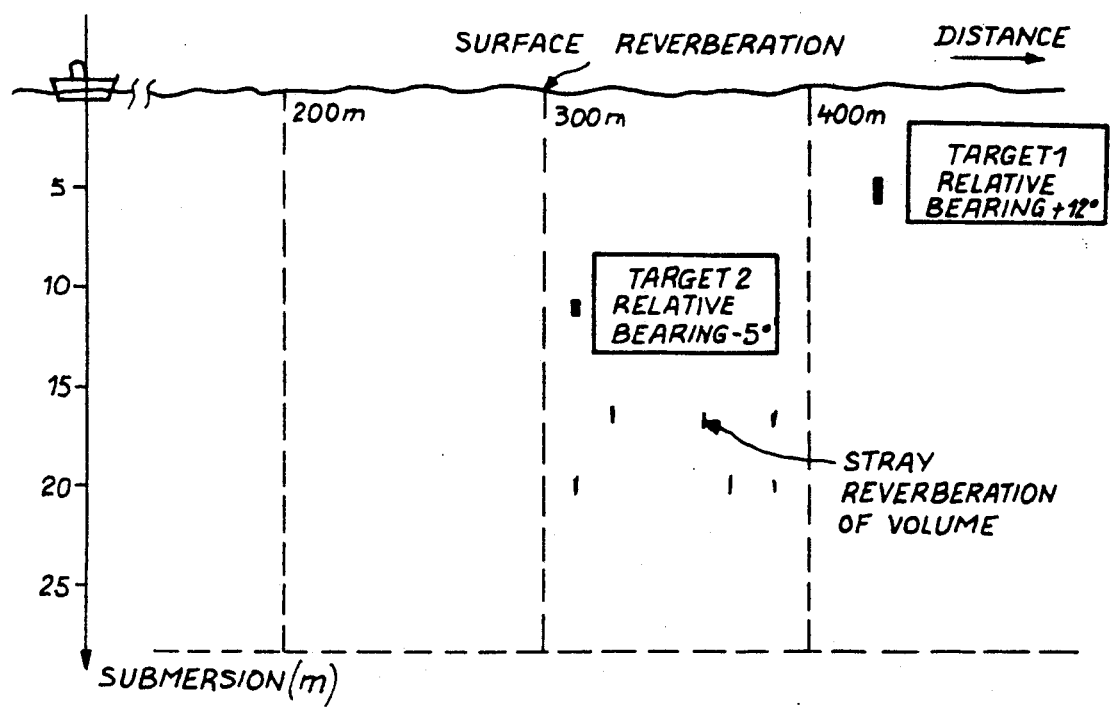

SONAR FOR AVOIDING SUB-SURFACE UNDERWATER OBJECTS

BACKGROUND OF THE INVENTION

1. Field of the Invention

The present invention relates to the detection and location of underwater objects located in the vicinity of the surface of the water by means of a frontal active sonar mounted on a surface vessel.

2. Description of the Prior Art

The sonars currently on the market are little suited to the detection of sub-surface underwater objects for different reasons. Their directivity in elevation is generally not optimized for observing the surface. Furthermore, the surface reverberation, especially when the sea is rough, creates a stray signal that masks the echo received from the object. Finally, these sonars possess no device for measuring the submersion of the target.

However, there exists a sonar system, designed chiefly to be mounted on a towed "fish", in which several channels in elevation, covering the entire height of water, are formed at reception. Since this sonar is chiefly designed for detection, its working frequency is low and, consequently, its directivity is not fine. The distance measurement or monopulse technique performed on both signals of two adjacent elevation channels is used to localize an object in elevation. This processing operation is done for each channel in relative bearing.

The amplitude distance measurement or amplitude monopulse technique consists in measuring the difference and the sum of the amplitudes of two signals received simultaneously by two adjacent channels, the patterns of directivity of which are identical, with the same phase center and pointed in two different directions $O_1$ and $O_2$. The difference/sum ratio then makes it possible to obtain the direction of the echo with respect to the mean direction $(O_1+O_2)/2$. The direction of the echo can also be obtained by phase distance measurement in forming two channels with two half-antennas so as to have offset phase centers.

SUMMARY OF THE INVENTION

The invention concerns a sonar that is capable of detecting the echos that come from an underwater object located in the vicinity of the surface, reducing the surface reverberation by spatial discrimination, measuring the depth of submersion of the object, having patterns of radiations servo-linked to the motions of the carrier, hence fixed with respect to the vertical to the location.

According to the invention there is proposed a sonar for avoiding sub-surface underwater objects, for a surface vessel, comprising an acoustic transmission and reception antenna, a transmission device and a reception device, wherein:

the transmission device generates a pulse transmission signal to discriminate among the underwater objects placed at different distances;

the acoustic antenna has at least one first vertical column of n acoustic transducers $C_1$ to $C_n$ making it possible, at transmission, to insonify an elevation sector corresponding to a collision-risk zone located in the vicinity of the surface of the sea and on the trajectory of the vessel and, at reception, to form fine channels in the insonified elevation sector so that, to a channel in elevation, there corresponds a measurement of submersion of a detected object, the width of the channels being all the finer as the desired precision of the measurement of the position in elevation is high.

BRIEF DESCRIPTION OF THE DRAWINGS

Other characteristics and advantages of the invention will appear clearly from the following description given as a non-restrictive example and made with reference to the appended figures of which:

FIG. 1 illustrates the detection and localization in elevation of the sub-surface underwater objects according to the invention;

FIG. 2 is the general block diagram of a sonar according to the invention;

FIG. 3 is an example of installation of the antenna on the vessel;

FIG. 4 represents the zone covered in relative bearing by the sonar from two angularly offset reception antennas;

FIG. 5 illustrates the measurement in relative bearing by the formation of two channels from six columns of n acoustic transducers;

FIG. 6 shows the block diagram of an acoustic column with six columns of n acoustic transducers;

FIG. 7 shows an example of a display of the detected objects.

DESCRIPTION OF PREFERRED EMBODIMENTS

FIG. 1 gives an illustration, in a vertical plane, of the detection and localization in elevation of the objects located at some meters beneath the surface of the water, according to the invention, by means of an acoustic antenna 10 placed vertically to the surface of the water. This antenna has a column of n acoustic transducers, or sensors, $C_1$ to $C_n$, with which it is possible to form fine lobes in elevation, beams $F_1$ to $F_k$, in order to partition the space finely in the vertical direction. Through the spatial directivity thus obtained, the surface reverberation is reduced to the minimum and an object located close to the surface is detected. Besides, the knowledge of the submersion of the antenna and of the beam in which the detected object is located enables the submersion of this object to be measured.

Since the acoustic antenna is preferably fixed rigidly to the carrier, it is possible to spatially stabilize the beams generated in elevation by adjusting the phases of the n transducers of the antenna. A vertical acoustic antenna comprising a column of n acoustic transducers thus makes it possible to detect a target and to measure its altitude but, within the zone insonified in relative bearing, its exact position cannot be determined in this way. To localize the target in relative bearing, the vertical antenna should have at least two columns of n transducers so that it is possible to carry out a measurement in relative bearing by the monopulse technique. To cover a sufficient space before the carrier, the directivity of the antenna in relative bearing should be at least equal to 30°.

The two columns of n transducers may be angularly offset, so as to have the same phase center, but different directions of transmission, to carry out a monopulse measurement of amplitude, or they may be in the same plane so as to have the same direction of transmission but different phase centers to carry out a monopulse measurement in phase. With an antenna having several columns of n transducers, some lobes in relative bearing can be generated in order to carry out a fine measurement in relative bearing by interpolation.

The measurements in elevation and in relative bearing can be done simultaneously or sequentially. It is also possible to form the lobes in elevation permanently and to put the monopulse measurement into operation only for the beams that detect a target.

The yawing motion of the carrier may be compensated for in order to obtain an absolute measurement in relative bearing.

As an example, a sonar according to the invention has been made for avoiding sub-surface underwater objects in order to protect a vessel against an objects near the surface. Its characteristics have been chosen so that the objects are detected at submersions levels of between 0 and 50 meters, the maximum distance of detection is equal to 500 meters, the distance of classification is between 200 meters and 300 meters, the aperture of the beam in relative bearing is equal to 30° (this represents ±125 m on either side of the vessel at a distance of 500 m) and the angular resolution vertically is equal to 0.5°.

The classification corresponds to the confirmation that the target is effectively in the volume of water located between a depth of 0 and 50 m, and that it is possible to measure its position with very high precision, namely ±4 m horizontally and ±2 m vertically. The ability to achieve vertical discrimination makes it possible to distinguish, as the case may be, several components of the target such as floats.

As indicated in the general block diagram of FIG. 2, this sonar consists of an acoustic antenna 10, fulfilling the functions of transmission and reception of the acoustic signals, a device 20 for the transmission, reception and processing of the signals, and a display device 30.

The acoustic antenna 10 is preferably fixed rigidly to the vessel, as shown in FIG. 3, so that the angular motions of the carrier can be compensated for electronically by servo-control in the device 20 for transmission, reception and processing of the signals. Setting up a fixed assembly of the antenna on the vessel is faster and more practical than setting up a system with mechanical stabilization. Furthermore, as shown in FIG. 3, the antenna is set up preferably on the stem of the vessel, with a mean submersion h equal, for example, to 3 m. To cover the danger zone and keep the target in the field of the sonar up to a close distance, for example 50 m, the sonar should cover a sector demarcated by an angle A1 equal to 3° above the horizontal. Similarly, to make a classification, at 200 m, of an object submerged at a depth of 30 m, the sonar should cover a sector demarcated by an angle of 9° below the horizontal. The total zone covered by the sonar is then demarcated by an angle of 12° vertically, broken down into A = ±6° if the permanent inclination of the antenna is B = 3° downwards when the pitching of the carrier is zero.

At transmission, the antenna will then insonify 12° in elevation and 30° in relative bearing. At reception, a column of n acoustic transducers will form, after processing, a number of channels k equal to 12°/0.5°, namely 24 channels in elevation if each lobe covers 0.5°. To prevent the formation of stray image lobes, the number of transducers n has been chosen as being equal to 100 in the vertical direction.

To obtain the requisite resolution equal to 0.5°, given the transmitted wavelength, the height of the antenna should be equal to 100, i.e. approximately one meter if the working frequency is 150 kHz: this choice is compatible with the maximum range of 500 m.

The function of measuring the position of the object in relative bearing is achieved in different ways, for example, by the use of two angularly offset transmission antenna, each antenna having a particular transmission frequency. The discrimination and the monopulse measurement are then achieved at reception after separation of the frequencies (this is then a monopulse measurement of amplitude].

A second way of making a measurement in relative bearing is to carry out a monopulse measurement of amplitude using two angularly offset reception antennas. This makes it possible to obtain satisfactory results with a relatively simple and low-cost device. The reception antennas are then formed by two columns of n transducers arranged along two inclined planes, each forming an angle D/2 with the horizontal plane a shown in FIG. 4 which represents the total coverage of the sonar in relative bearing in this case, assuming that the measurement on the flanks of the patterns is possible up to −12 dB. Two lobes in relative bearing are obtained by the directivity proper to each of the two antennas, the patterns of directivity having the same phase center and being pointed in directions forming an angle D with each other. The total coverage of the sonar comprises three zones:

the central aperture zone D in which the monopulse measurement can be made, for the reception levels range between 0 and −12 dB on the two channels (the signal in the axis is equal to −3 dB on both channels);

the hatchured zones to the left and to the right in which the detection is possible but the monopulse measurement is impossible. In these hatchured zones, characterized by a difference in levels on the upper channels at 12 dB, it is possible to use the detection as an alarm: the vessel can then either go towards the alarm to position it in the sector D and classify it or turn in the opposite direction to avoid it.

In the case of two angularly offset reception antennas, the detection sector of the sonar therefore has an angular width equal to 2D, the fine measurement being effectively achieved in a sector with an angular width D. The angle D is chosen so as to avoid having a zero on one of the channels and so as to cover the entire danger zone. For example, the angle D is between 30° and 45°.

Finally, it is also possible to carry out a measurement in relative bearing by forming, at reception, two channels using some columns of n transducers. In this case, to cover a 30° sector, the two channels of reception in relative bearing will have, for example, aperture angles D = 15° and will be separated by an angle D = 15°.

FIG. 5, which represents the formation of the two channels using six columns of n transducers in a horizontal plane, shows m = 6 horizontal sensors belonging to six different columns of n sensors. The signals coming from these six sensors are phase-shifted and summed up in the phase-shifter/adder circuits, 11 and 12, so as to form the two channels in relative bearing. It is with these two channels in relative bearing that the position in relative bearing of the detected object is computed, using the monopulse method (in phase and/or in amplitude) in the transmission, reception and processing device 20. The outputs of the phase-shifter/adder circuits 11 and 12 are connected to pre-amplifiers 13 and 14 with gain variable in time, so as to standardize the signal. This processing is applied to all the transducers of the antenna.

FIG. 6 shows a block diagram of an acoustic antenna comprising six columns of n acoustic transducers. Thus, as shown in this figure, the antenna 10 includes, for reception, m=6 columns of n acoustic sensors, 2n phase-shifter/adder circuits $(11)_1$ to $(11)n$ and $(12)_1$ to $(12)n$, and 2n pre-amplifiers $(13)_1$ to $(13)n$ and $(14)_n$ to $(14)n$. At transmission only three columns of n sensors are used to cover the space of angular aperture of 12° in elevation and 30° in relative bearing.

The transmission, reception and processing device 20 is placed at any distance from the antenna 10. It has the following functions:

the electrical generation of the transmission signal. This transmission signal is pulsed so that it can discriminate among targets placed at different distances. The duration of transmission is between 0.2 and 1 ms.

the reception of the signals coming from 2n pre-amplifiers with the following successively: the standard processing operations in sonar techniques such as the amplification and the filtering of the signal, the demodulation, the digitization, the compensation for the motions of the carrier in phase-shifting the sensors proportionately to the pitching of the carrier, the formation of the twice 24 channels in elevation (at this stage, the channels are stabilized), the phase and/or amplitude monopulse processing operation on the designated targets and the interfacing with the display device 30.

It is possible to make several depictions of results, among which, for example, the distance and the depth are shown respectively on the x-axis and on the y-axis. Another depiction consists, for example, in the use of an automatic extractor of the targets which gives the operator an alarm and the position of a target when it is detected.

FIG. 7 shows an example of a display screen in which the two foregoing depictions are combined and which makes it possible to have a superimposition, in one and the same pattern, of firstly the display of the raw information and, secondly, the extraction of the target and the display of its coordinates.

The invention is not restricted to the embodiments specifically described above. In particular, the detailed embodiment shown in FIG. 6 is complete and its cost remains acceptable, but it can be simplified if a reduction is accepted in the resolution of the number of preformed channels or if we can make do with a relatively low-precision measurement in relative bearing, the essential characteristic of the invention being a precise measurement in elevation.

What is claimed is:

1. A sonar system for avoiding sub-surface underwater objects, for a surface vessel comprising:

a transmission device for generating pulse transmission signals to discriminate among underwater objects located at different distances from said transmission device;

an acoustic antenna having a plurality of transducers for the receipt of signals wherein said plurality of transducers are formed into a vertically arranged column of n acoustic transducers $C_1$ and $C_n$ for insonifying the returns of signals into sectors such that an elevation sector which corresponds to a collision-risk zone is formed in the vicinity of the surface of the sea in the projected path of the vessel, and further that on reception of signals said transducers form finer channels in the insonified elevation sectors than that of the entire sector received in order to detect locations of submersed objects by way of setting the width of said fine channels to be narrower; and wherein the placement of the transducers allows reduction of surface reverberation by way of a discrimination between an actual return signal and a surface wave reverberation.

2. A sonar according to claim 1, wherein the acoustic antenna has at least one second column of N acoustic transducers for localizing of a object in relative bearing, and wherein the acoustic antenna, at transmission, insonifies a relative bearing sector having an angular aperture at least equal to 30°.

3. A sonar according to claims 1 or 2, wherein the acoustic antenna is fixed rigidly to the vessel at an submersion h equal to some meters and inclined downwards, with respect to a horizontal plane, by an angle B equal to some degrees.

4. A sonar according to claim 3, comprising means for servo-linking the radiation patterns to the motions of the vessel.

5. A sonar according to claim 4, wherein the directions of transmission of the two columns of transducers are identical to carry out, in relative bearing, a monopulse measurement in phase.

6. A sonar according to claim 4, wherein the directions of transmission of the two columns of transducers make an angle D of between 30° and 45° to carry out, in relative bearing, a monopulse measurement in amplitude.

7. A sonar according to claim 4, wherein the acoustic antenna has m columns of n acoustic transducers to form several lobes in relative bearing.

8. A sonar according to claim 7, wherein the measurements in elevation and in relative bearing are simultaneous.

9. A sonar according to claim 7, wherein the measurements in elevation and in relative bearing are sequential.

10. A sonar according to claim 7, wherein the channels in elevation are formed in fixed positions and further a monopulse measurement occurs resultant to the detection of an object and is performed only in a given elevation channel where said detection has occurred.

* * * * *